US011312853B2

(12) United States Patent
Akarsu Dülgar et al.

(10) Patent No.: US 11,312,853 B2
(45) Date of Patent: Apr. 26, 2022

(54) POLYMODAL POLYMER COMPOSITION

(71) Applicant: ORGANIK KIMYA SANAYI VE TIC. A.S., Istanbul (TR)

(72) Inventors: Cansu Akarsu Dülgar, Istanbul (TR); Guillermo Perez Lorenzo, Istanbul (TR); Ecem Temelkaya Bilgin, Istanbul (TR); Sibel Altinok, Istanbul (TR)

(73) Assignee: ORGANIK KIMYA SANAYI VE TIC. A.S., Istanbul (TR)

( * ) Notice: Subject to any disclaimer, the term of this patent is extended or adjusted under 35 U.S.C. 154(b) by 324 days.

(21) Appl. No.: 16/489,611

(22) PCT Filed: Mar. 6, 2018

(86) PCT No.: PCT/EP2018/055423
§ 371 (c)(1),
(2) Date: Aug. 28, 2019

(87) PCT Pub. No.: WO2018/162455
PCT Pub. Date: Sep. 13, 2018

(65) Prior Publication Data
US 2020/0115536 A1    Apr. 16, 2020

(30) Foreign Application Priority Data

Mar. 7, 2017 (EP) ..................... 17000368

(51) Int. Cl.
C08L 33/08 (2006.01)
C09J 133/08 (2006.01)

(52) U.S. Cl.
CPC ............. *C08L 33/08* (2013.01); *C09J 133/08* (2013.01); *C08L 2205/025* (2013.01)

(58) Field of Classification Search
CPC .............. C08L 33/08; C08L 2205/025; C08L 2207/53; C09J 133/08
See application file for complete search history.

(56) References Cited

U.S. PATENT DOCUMENTS

| 4,567,099 A | 1/1986 | Van Gilder et al. |
| 6,673,451 B2 | 1/2004 | Bardman et al. |
| 8,053,511 B2 | 11/2011 | Muller et al. |
| 2003/0236374 A1* | 12/2003 | Bardman ............... C08F 230/02 526/274 |
| 2009/0092677 A1 | 4/2009 | Richard |
| 2010/0081764 A1 | 4/2010 | Ouzineb et al. |
| 2015/0344746 A1 | 12/2015 | Ha et al. |
| 2018/0079835 A1* | 3/2018 | Bohling ............... C08F 230/02 |

FOREIGN PATENT DOCUMENTS

| EP | 1240223 B1 | 1/2004 |
| EP | 1344786 A3 | 8/2004 |
| EP | 1498430 B1 | 9/2007 |
| EP | 1940901 B1 | 9/2014 |
| WO | 2013/070478 A1 | 5/2013 |

OTHER PUBLICATIONS

International Search Report dated Apr. 12, 2018, for corresponding International Patent Application No. PCT/EP2018/055423.
Written Opinion dated Apr. 12, 2018, for corresponding International Patent Application No. PCT/EP2018/055423.
International Preliminary Report on Patentability dated Sep. 10, 2019, for corresponding International Patent Application No. PCT/EP2018/055423.

* cited by examiner

*Primary Examiner* — Michael M Dollinger
(74) *Attorney, Agent, or Firm* — Pergament & Cepeda LLP; Milagros A. Cepeda; Edward D. Pergament

(57) ABSTRACT

The present invention relates to a polymodal polymer composition having homogeneous as well as heterogeneous particles, formed by radical emulsion polymerization of primarily acrylic acid ester monomers of C2 to C10 alcohols, wherein the homopolymers of these monomers have Tg's below −15° C. The polymer composition is composed of at least two different populations of particles, differing in mean particle size value by at least a factor of 2. Thus, the two different populations of polymer particles in the polymer composition differ with respect to size and monomer composition of the particles. The polymer composition has excellent adhesion on low surface energy substrates such as low density and high density polyethylene and has enhanced resistance to water whitening which is a required specification in filmic label applications. The present invention also relates to a multistage process for producing said polymodal polymer composition having heterogeneous particles, formed by radical emulsion polymerization of primarily acrylic acid ester monomers of C2 to C10 alcohols.

11 Claims, No Drawings

POLYMODAL POLYMER COMPOSITION

This application is a National Stage Application under 35 U.S.C. § 371 of PCT International Application No. PCT/EP2018/055423, filed Mar. 6, 2018, which takes priority from European Provisional Application Number EP 17000368.5, filed Mar. 7, 2017, all of which are herein incorporated by reference in their entirety.

The present invention relates to a polymodal polymer composition having homogeneous as well as heterogeneous particles formed by radical emulsion polymerization of primarily acrylic acid ester monomers of C2 to C10 alcohols, wherein the homopolymers of these monomers have glass transition temperatures (Tg's) below −15° C. The polymer composition is composed of at least two different populations of particles, differing in mean particle size value by at least a factor of 2. Thus, the two different populations of polymer particles in the polymer composition differ with respect to size and monomer composition of the particles. The polymer composition has excellent adhesion on low surface energy substrates such as low density and high density polyethylene and has enhanced resistance to water whitening which is a required specification in filmic label applications. The present invention also relates to a multi-stage process for producing said polymodal polymer composition having homogeneous as well as heterogeneous particles, formed by radical emulsion polymerization of primarily acrylic acid ester monomers of C2 to C10 alcohols.

Water based pressure sensitive adhesives are conventionally produced by emulsion polymerization technique which is well known in the state of the art and they provide a variety of advantages over solvent based adhesives by having ease of application, low manufacturing cost and including no volatile organic compounds. They can be employed in a wide variety of applications and their performance mainly depend on the properties and the behavior of the additives they contain. Emulsion polymerization mainly requires the following key ingredients: a monomer or a monomer mixture, a surfactant or a surfactant mixture, an initiator and water as the continuous phase. The monomer or monomer mixture is emulsified into the droplets with the aid of surfactant or surfactant mixture and high shear agitation. Surfactants are used to support the polymerization reaction and enhance emulsion stability. Although their presence is essential during synthesis, they may have adverse effects on the adhesive film's long term performance.

Polymer particles are formed during polymerization either inside the monomer droplets having diameters from 1 to 10 microns or in the water phase according to the hydrophilic nature of monomers. Some of the additives such as tackifiers, thickeners, etc., are blended into the formulation in order to optimize the desired properties. The resulting product which is an emulsion polymer, typically has a broad particle size distribution.

Polyacrylate dispersions for pressure sensitive adhesives are typically produced with solid contents between 50% to 70% and average particle sizes are typically between 100 nm to 1000 nm. In order to produce dispersions with high solid content (>60%) and low viscosity (<500 MPa) at the same time, the dispersions need to have a bimodal or polymodal particle size distribution. The means for forming polymers with bimodal or polymodal particle size distributions are well known in the art and include methods such as using different sized seeds, introducing seed polymers into the polymerization medium and changing the feed rate.

Pressure sensitive adhesives having a bimodal particle size or molecular weight distributions can be both produced by conventional emulsion polymerization or mini emulsion processes. Some studies on the pressure sensitive adhesive performance of latices indicated that, although conventional emulsion polymerization and mini-emulsion polymerization methods were successful in creating bimodal polymers, the peaks of particle size and molecular weight obtained by conventional emulsion and mini-emulsion processes were different and thus, it was not easy to distinguish between the effects of different particle size or molecular weight distribution on the properties of these pressure sensitive adhesive polymers. However, the following difference of mini emulsion polymerization may result as an advantage in the process: Mini-emulsion polymerization differs from conventional emulsion polymerization in that the reaction proceeds under droplet nucleation conditions and not via micellar or homogeneous nucleation. A properly formulated mini-emulsion is able to reach a kinetically stable state in which the droplets with diameters on the order of 100 nm act as nano-reactors and diffusion of monomer through the aqueous phase could be minimized. This compartmentalized characteristic can allow for the production of a bimodal molecular weight or particle size distribution in situ without the need of multiple seeds.

The synthesis of latex polymers with high solids content and low viscosity has gained great interest from both industry and academia. Highly concentrated emulsions with a solid content above 60% have numerous advantages including the higher unitary usage of industrial installations during production and the faster drying rates during application. Low viscosity enhances the heat removal rate and agitation during the polymerization process, which results in improvements of safety, production capacity and product quality. Additionally, low viscosity of the emulsion polymer adhesives enhances also the convenience of application on high speed coater machines. For a given solid content, the viscosity of latex decreases with the increase of average particle size.

Adsorption of anionic or cationic surfactants and incorporation of ionic groups into the polymer provides highly stable polymer dispersions. Nonionic type of stabilization takes place via hydrophilic groups on the particle surface by amino or hydroxyl-containing monomers or protective colloids. Industrially used polymer dispersions are usually stabilized by both mechanisms. The special nature of the particle surface, which differs from particle interior, plays an important role in all applications. Surface characteristics of particles depend on physical properties such as roughness, surface energy, mechanical properties or the chemical composition of the surface. Good wettability of a surface is essential to provide good bonding which is related to the surface energy. Wetting is determined as the spreading and contact of a liquid (adhesive) over a solid surface (substrate). If contact is sufficiently achieved between the two phases, a physical attraction from inter-molecular forces occurs.

The surface free energy (SFE) depends on intermolecular forces and comprises the contributions from nonpolar (e.g., van der Waals) and polar (e.g., hydrogen bonding) components. Adhesives having an SFE that is less than the SFE of a substrate will readily wet the substrate surface and form strong adhesive bonds. If sufficiently extensive contact is achieved between the substrate and the adhesive, then the physical interactions or bonds that form between the atoms of the two surfaces result in surface wetting. Such physical interactions arise from highly localized intermolecular forces. Wetting may be due to (a) acid-base interactions, (b)

the formation of weak hydrogen bonds, or (c) van der Waals forces (dipole-dipole and dispersion forces). The extent of wetting depends on the difference between the SFEs of the substrate and adhesive materials; cf. Kowalski, "How does the surface free energy influence the tack of acrylic pressure-sensitive adhesives PSAs", 2013.

Among stainless steel (SS), glass, aluminum, low and high density polyethylene (LDPE and HDPE) substrates, the surfaces having poorest wettability are HDPE and LDPE surfaces due to their low surface energies which have critical surface tensions of wetting of about 35 mJ/m$^2$ or less. Polyvinyl chloride (PVC) substrates have surface energy around 39 mJ/m$^2$. Aluminum, glass and stainless steel are mentioned as materials having high surface energies above 38 mJ/m$^2$.

In several researches, the work on pressure sensitive adhesives (PSAs) has been reported by using different type of monomers in various formulations. According to those researches a PSA must be soft and tacky. Thus, its glass transition temperature (Tg) should be low, ranging from −20° C. to −60° C. Polymers with a low Tg, typically from a class of alkyl acrylates such as poly(butyl acrylate) and poly(2-ethylhexyl acrylate), are inherently soft and tacky, but do not possess adequate shear strength. On the other hand, polar monomers are used in copolymerization in order to vary the chemical and physical properties of the adhesives so that the adhesives' mechanical properties such as cohesion are improved. Their inclusion increases the Tg and this may be explained by increasing dipole interaction or enhanced hydrogen bonding. Polar groups in polymers increase intermolecular forces and thus reduce the free volume and increase the Tg. Polar monomers are introduced for improving the cohesion with a decrease on the amount of surface active agents. A previous study of n-butyl acrylate acrylic acid copolymer showed greater cohesive and adhesive strength than poly(n-butyl acrylate). This was explained by the intermolecular dipole-dipole interactions due to —COOH groups. Further, n-butyl acrylate-acrylic acid-hydroxy functional monomers showed excellent properties indicating the significance of the hydroxyl groups and their possible hydrogen bonding with —COOH groups.

The surface of particles dispersed in an aqueous phase is particularly important for pressure sensitive adhesives as well as inner structure of particles for imparting several properties to polymer dispersions. Moreover, the heterogeneity of polymer particles without having distinct layers, without separate core or shell regions within themselves is also found to impart specific properties to pressure sensitive adhesives. Thus, particles having heterogeneous monomer composition stemming from multiple heterogeneous polymer chains, without having distinct layers, separate core or shell regions within the particles, can be achieved by emulsion polymerization depending on various physical parameters in multiple polymerization stages in order to benefit from the different properties gained by the non-uniform, heterogeneous monomer compositions of the particles.

Particles with a heterogeneous structure in a dispersion having polymodal particle size distribution can enhance wear-resistance, water-resistance, weather-resistance, stain-repellent, anti-radiation performance, tensile strength, impact strength and adhesive strength of aqueous polymer dispersions while improving their transparency significantly and reducing the minimum film forming temperature. Thus, properties arising from particles having a heterogeneous composition can be tuned up by adjusting the constituting materials of the polymer particles.

Pressure sensitive adhesives (PSAs) are defined as permanently tacky materials that adhere with pressure and apply a strong holding force. Adhesion is simply the ability of adhesives to wet the substrate and then bond to it. Cohesion on the other hand is the internal strength of an adhesive to itself. Several factors other than the chemical properties of the adhesive also effect the adhesion. Some of these factors, as mentioned before, are due to the substrate on which the adhesive is applied, for instance the roughness, humidity and moisture, surface tension and shape of the substrate. Others are labelling temperature, service temperature, resistance to oxidation and UV light. Adhesion can also be defined as the molecular attraction between unlike materials, similar to magnetic force. The surface energy of a material determines the strength of this attraction. Lower surface energy means weaker attraction; hence, materials that have high surface energy are easy to adhere materials. However, for instance, (low density and high density) polyethylene materials have low surface energies and they are hard to adhere surfaces.

Further, the prevention of water whitening in clear label and exterior applications of waterborne pressure sensitive adhesives is very important due to exposure of high temperature water during the application. It is also important to prevent whitening caused by moisture and water after application, for instance, in the cold beverage bottles and plastic boxes (shampoo bottles). Water whitening is a very complex phenomenon and it can be defined as the discoloration that occurs due to exposure to water, of an adhesive film having segregated surfactant domains. It is believed to be caused by the water molecules penetrating into the adhesive film and accumulation of water inside these domains. The effect of temperature on the rate of this change is significant. At high temperatures the waterborne acrylic adhesives turn white very rapidly. In the end the adhesive film loses its tackiness.

To improve the water whitening performance, one should prevent either the segregation of ionic species and surfactant during film formation or seriously limit the swelling of the hydrophilic domains by absorbed water. Water whitening performance can be improved by decreasing the average particle size in low solid pressure sensitive adhesive dispersions. However, in high solid monomodal dispersions, the decrease of particle size would result in high viscosity and this is not desired in high speed coating machines. For use in high speed coating machines, a high solid low viscosity (bimodal/polymodal) polymer should be produced. The double seeded polymerization process for the production of such a polymer is well known in the state of the art.

In WO 2013/070478 A1, a bimodal toughening agent is disclosed wherein the bimodal toughening agent comprises a) a first and b) a second preformed core-shell toughening agents. The particle size of the second toughening agent is twice as much of the first toughening agent and the bimodal toughening agent is used in a thermosettable epoxy resin composition. It is also disclosed that fracture toughness is improved due to a synergy resulting from using a bimodal particle size distribution of preformed core-shell type toughening agents. The particles have a core-shell morphology with distinct regions. Besides, the technical effect resulting from said synergy is directed to fracture toughness but it is not related to adhesion or cohesion of a bimodal adhesive composition, comprising heterogeneous particles as the population with the larger particles. Additionally, said agents forming the composition are preformed, meaning that first and second toughening agents are produced by different processes, causing extra operations.

In EP 1 498 430 B1, a process is disclosed for preparing an aqueous polymer dispersion containing at least two different modes of polymer particles which differ by at least one attribute such as particle diameter, molecular weight, composition, glass transition temperature or morphology. The different formulations in many applications are said to be prepared in order to optimize desired properties and many different combinations are mentioned. However, specifically, a better adhesion due to a synergistic effect arising from a specific combination of heterogeneous monomer composition and bimodal particle size distribution is not disclosed. Additionally, the polymerization for preparing the polymer dispersion occurs in an aqueous medium in the presence of polymerization blockers which could affect performance of the end product by causing impurities. Besides, even if they are used in small amounts, they increase the costs of the product. Additionally, since it prevents the reaction, the timing of the addition is crucial and this increases the number of steps in the process.

EP 1 240 223 B1 discloses a polymodal multistage polymeric material which can provide very high solid content while having low viscosity and exhibit improved properties such as drying rates, film formation and blocking resistance. Said polymeric material comprises i) polymers of at least two polymerization stages having a Tg difference of 20° C. to 60° C. and ii) polymers of at least two polymerization stages having a particle size differing by 50 nm to 100 nm. The means to form at least one of the differing Tg's in i) and at least one of the differing particle sizes (Dw's) in ii) are carried out in different stages of the multistage polymerization to form the polymeric material. At the end, a polymeric material having large and small particles exhibits said properties, where they also differ in being hard or soft determined by the Tg of the polymers. However, neither heterogeneous particles are disclosed nor the incorporation of hard/soft polymers in a polymodal particle distribution results in a good adhesion.

In EP 1 940 901 B1, an impact modified acrylic based composition having a bimodal distribution of impact modifier particle sizes is disclosed. Here, the bimodal particle size distribution is used not for achieving higher solids in a polymer emulsion, but for optimizing the desired properties of impact modifiers. It has been mentioned that an acrylic composition having small and large particle size impact modifiers exhibit both good impact performance and appearance after melt processing. Core-shell multilayer polymers are also disclosed as preferred impact modifiers. However, combined with a bimodal particle size distribution their technical effect is limited with optimizing impact performance and appearance of impact modifiers.

EP 1 344 786 A2 discloses a polymer composition useful for preparing coatings for metal substrates having improved solvent resistance. It is disclosed therein that these polymers may have bimodal particle size distribution. It is also said that these polymers may have core-shell morphologies. Additionally, according to one embodiment of the disclosure, the copolymers having aldehyde reactive group containing monomer as copolymerized units are useful for preparing dry coatings having improved adhesion to substrates. However, the improved adhesion is due to aldehyde reactive groups of the copolymer particles. Besides, there is neither any indication of using bimodal particle size distribution and core-shell morphology together nor the technical effect of such an interaction.

In US 2010/0081764 A1, an aqueous dispersion of heterogeneous polymer particles produced by mini emulsion polymerization is disclosed. It is also disclosed that a bimodal molecular weight distribution can be obtained during synthesis wherein low molecular weight particles contribute to an improved level of adhesion and higher molecular weight particles ensure a good level of cohesion. The "heterogeneous polymer particle" term in this disclosure is used interchangeably with a core shell particle morphology which has distinct layers having differing Tg's.

In AU 4 658 085 A, a similar use of the term "heterogeneous particles" is disclosed: a bimodal polymer latex comprising two separate and distinct particle size distributions of large and small size particles wherein the large size particles comprise particles which are heterogeneous in nature having a soft polymer domain and a hard polymer domain. The heterogeneous nature of the large size particles provides a desirable gloss and a binding characteristic to the coating formulation as stated therein.

U.S. Pat. No. 6,673,451 discloses an aqueous multimodal polymeric dispersion wherein at least one mode of polymer particles includes a core and at least two shells with differing Tg's and contains at least one void. According to said document, a bimodal emulsion polymer particle size distribution with at least one of particle populations containing voids permits improvements in paper and paperboard coating compositions and is suitable for forming paint compositions.

In U.S. Pat. No. 8,053,511, dispersions to be used in a wide variety of applications including adhesives are disclosed. These dispersions can be copolymers having a homogeneous or heterogeneous particle morphology. However, no specific reference has been found regarding the effect of heterogeneous particle morphology on the adhesive properties.

In US 2009/0092677 A1, compositions containing injectable particles having at least two polymeric components that differ in composition from one another are disclosed. These particles are mentioned as heterogeneous with regions that are chemically different from each other. Even though bimodal delivery profiles are also mentioned in some of the embodiments, the disclosure is in a totally different technical field and has a totally different purpose in employing heterogeneous particles.

Thus, an object of the present invention is to provide a non-water whitening polymer composition having low viscosity with an improved adhesion when adhering on hard to adhere surfaces.

This object is solved by the embodiments characterized in the claims.

Accordingly, in an embodiment of the present invention there is disclosed a polymodal polymer composition formed by radical emulsion polymerization of primarily acrylic acid ester monomers of C2 to C10 alcohols which form homopolymers having Tg's below −15° C., characterized in that the polymodal polymer composition is composed of at least two different populations of particles, said populations differing in mean particle size value by at least a factor of 2, wherein said two different populations jointly constitute at least 75% by weight of the total polymeric content within said composition and the Tg difference between the two populations being less than 20° C., wherein (a) a population $P_2$ is constituted by at least 70% by weight of homogeneous particles containing polymer chains built of acrylate monomer B which forms homopolymers having a Tg below −15° C., wherein the content of said monomer B in these polymer chains is at least 70% by weight, and (b) a population $P_1$, distinctive of $P_2$ by mean particle size value and monomer composition, of which the particles are constituted of polymer chains predominantly built of two acrylate monomers A and B, wherein monomer A also results in a homopolymer with Tg below −15° C., but where A and B differ from another by at least 2 C atoms in the alcohol side chain, said population $P_1$ being constituted by at least 70% by weight of monomers A+B, wherein A and B are not randomly co-polymerized, but in a sequential process whereby one monomer is polymerized after the other, inducing compositional heterogeneity in those polymeric chains constituting the particles of said population.

In a preferred embodiment, the polymodal polymer composition further comprises (c) up to 20% of other monomers resulting in homopolymers with Tg's above −15° C., up to 5% of functional monomers containing carboxylic, sulfonic or phosphoric acid functionality, poly-unsaturated monomers, epoxy, hydroxy, amino, amido, di-carbonyl, and siloxane, and up to 5% of surface-active components, including anionic and non-ionic surfactants, water-soluble colloids and polyelectrolytes capable of stabilizing polymer particles in the aqueous medium.

The resulting polymer composition is a non-water whitening polymer dispersion having improved adhesion on too hard to adhere non-polar substrates. A synergistic effect is given by a specific combination of different polymer particles populations ($P_1$, $P_2$), wherein these populations contain particles having different monomer combinations and include a population of larger particles (population $P_1$) with a heterogeneous monomer combination, in order to achieve a better performance in one or more specific properties of such pressure sensitive adhesive composition.

According to the present invention, the performance of these low viscosity (polymodal) polymers is found to improve when a population of larger particles (population $P_1$) in the dispersion have a heterogeneous monomer combination.

The polymodal polymer composition with homogeneous as well as heterogeneous particles according to the present invention can be produced by a multistage radical emulsion polymerization. Thus, another embodiment of the present invention relates to a process for producing the polymer composition according to the present invention, which comprises the steps of:

separately providing a seed polymer having an average particle size of 10 nm to 100 nm, providing a first monomer emulsion comprising monomer A, and providing a second monomer emulsion comprising monomer B, respectively, polymerizing the first monomer emulsion by radical emulsion polymerization in an aqueous polymerization medium containing a first seed polymer;

adding a second seed polymer and the second monomer emulsion to the polymerization medium; and polymerizing the second monomer emulsion, so as to produce particles of populations $P_1$ and $P_2$.

In the state of the art, the terms "core-shell morphology", "core-shell structure", "core-shell particles", "core-shell composition", "multilayered particles", "heterogeneous particles" are generally used interchangeably and mean a polymer particle of which the structure and/or chemical composition (e.g., monomer composition and/or amount) changes from the center to the surface of the particle and, as a result, these disparate zones can have different physical and chemical properties. These polymers are produced by seeded multistage emulsion polymerization method and by feeding different kinds of monomer emulsion compositions into the polymerization medium, in different stages of the polymerization process. The structure of these multilayered polymers constitutes the chemical and/or physical bonding and/or attraction between the polymer(s) forming the core portion (inner layer) and the polymer(s) forming the shell portion (outer layer). Accordingly, the terms "core" and "shell" refer to the polymeric content of the inside and the outside of the particle, respectively. For most of the time using said terms should not be construed as meaning that the polymer particles will exhibit precisely a distinct interface at a determined position along the gradient from the center to the surface of the particle or between the polymers of the core and the shell of the particle. However, in theory this is exactly what is targeted although there might be some deviations from the theory in experimental results. So, the polymer structure or composition of these core-shell particles may be changing along any radius of the particle without having a distinct interface. In most of the preferred embodiments in the state of the art, the difference in the structure and composition of the core and the shell may be characterized in such a way, the transition from the core to the shell may be determined in a range along the radius.

As used herein and throughout the specification the term "heterogeneous particle(s)" does not refer at all to core-shell or multilayered particles. There are two main population of particles in the polymodal polymer composition according to the present invention:

i) The polymer chains constituting the particles of the population with the smaller particle size ($P_2$) are homogeneous in monomer combination. Homogeneous monomer composition means that the polymer chains within these particles have the same monomer ratios and those monomers are distributed in the same way throughout the polymer chains, with minor, unintended differences attributable to the radical emulsion polymerization process itself.

ii) The polymer chains constituting the particles of the population with the larger particle size ($P_1$) are not homogeneous in monomer combination. There will be polymer chains in which one domain in the polymer chain is composed of the monomer combination of a first step of polymerization, whereas another domain in the same chain is constituted by the monomer combination of a second polymerization step. There will also be, within the same large particles, polymer chains constituted only by the monomer combination of the first step as well as polymer chains constituted by the monomer combination of a second or a third step. This is achieved by using different monomer combinations, at different steps in the polymerization process, wherein the Tg value of the homopolymers formed by these monomers would be less than −15° C. Since the difference in Tg and hydrophobicity of the different monomer combinations used at the different polymerization steps are small, distinct interphases or regions in the particles will not be formed. Therefore, the particles having a heterogeneous monomer combination throughout the polymer chains, are called as heterogeneous particles throughout the specification in order to differentiate from multilayer or core shell particles which have distinct interphases or regions within themselves due to Tg and/or significant hydrophobicity differences.

Thus, the term "heterogeneous particle" as used herein and throughout the specification refers to a particle with a non-uniform monomer combination without a distinct interface, separate layers or regions along a radius from the center to the surface of the particle. When in any of the polymerization steps small amounts (typically less than 5% based on the total monomer amount in that polymerization step) of a pre-polymer (seed polymer or pre-form) is used, that seed is not taken into account for the above given definitions.

As used herein and throughout the specification the term "polymodal" means that there are two or more different populations of particles in the composition/dispersion and the particles in each population, discriminated according to mass fractions, differ from the other population with respect to particle sizes.

The polymodal polymer composition with homogeneous as well as heterogeneous particles according to the present invention is especially useful as pressure sensitive adhesives in filmic label applications in which non-water whitening performance and excellent adhesion to a multitude of low and high energy substrates are required in order to stand still under tough conditions, excessive moisture and other challenges. The acrylic pressure sensitive adhesives are especially used for imparting non water whitening to labels, and also in several applications such as protective films, film print lamination, flooring adhesive, tapes etc.

As mentioned above, the present invention is based on the specific combination of populations of large and small polymer particles wherein these populations contain particles having different monomer compositions. The population of larger particles has a heterogeneous monomer composition, in order to achieve a better performance in one or more specific properties of the pressure sensitive adhesive composition described above. As used herein and throughout the specification "large population" or "large(r) particles" refer to particles having an average particle size of over 250 nm. The average particle size is determined by using laser diffraction, particularly by using the device Zetasizer Nanoseries Zen 1600 model. "Small particles", "small population", "fine particles" or "fine population" refer to particles having an average particle size of below 250 nm.

The polymodal polymer composition with homogeneous as well as heterogeneous particles according to the present invention can be produced by using delayed addition radical emulsion polymerization. The term "seed polymer" as used herein refers to an aqueous polymer dispersion having finely divided particles. It can be prepared by emulsion polymerization method. The average particle size of the seed polymer particles is typically between 10 nm to 100 nm, preferably 30 nm to 75 nm. The particle size of the seed is very important for controlling the particle size distribution of the resulting polymodal polymer composition. The resulting seed polymer is firstly used in the initiation step of the polymerization.

Prior to polymerization, the monomer emulsions should be prepared in two separate vessels equipped with an agitator. Two separate vessels are required since the second monomer emulsion composition, which is different from the first monomer emulsion, should be ready to be subsequently added to the first monomer emulsion. Apart from deionized water, surfactants are commonly used in both of the vessels. The water/surfactant mixture can be agitated with high shear agitator. For preparing the monomer emulsion compositions, the monomers are slowly added into the water/surfactant mixture under sufficient stirring for making a monomer pre-emulsion. n-butyl acrylate (BA) and/or acrylic acid (AA) are preferably used in the first monomer emulsion. The composition of the second monomer emulsion preferably includes ethyl acrylate, acrylic acid, hydroxyl ethyl methacrylate, methyl methacrylate, 2-ethylhexyl acrylate and octyl acrylate as monomers. After completing all the additions, agitation should continue under sufficient rate until the resulting monomer emulsion is homogeneous and its appearance turns viscous and milky.

Starting and delayed initiators are prepared by dissolving in water in proper vessels before starting the polymerization reaction. Catalysts well known in the prior art can be used as the initiator.

Delayed radical emulsion polymerization and seeded polymerization methods can be used for the initiation step of the polymerization process. The mere role of the surfactant in this system is simply to avoid coagulation by maintaining the stability of the polymer particles. Deionized water is used throughout the whole polymerization process. In order to produce the polymer composition having a polymodal particle size distribution comprising heterogeneous particles, a multistage process is employed. Preferably, seed polymerization is used. Before the first stage, the seed polymer is produced by emulsion polymerization. The particle size of the seed polymer is important but its monomer composition is not relevant for the purpose of the invention. The role of the seed is to produce the intended particle size distributions. At the beginning of the process, the seed polymer 1, starting initiator solution and water are initially charged into the reactor. After that, the first monomer emulsion (Emulsion 1) and approximately half of the delayed initiator solution are fed in parallel into the reactor. Following the end of the first feed, seed polymer 2 is added into the reactor. Seed polymer 1 and seed polymer 2 can be same or different with each other with respect to amount, particle size and/or monomer composition. The second feed starts with the parallel flow of the second monomer emulsion (Emulsion 2) and the remaining delayed initiator solution. After the end of the polymerization reaction, it is possible that redox reactions may be applied at a lower temperature. A redox post polymerization step provides lower residual monomer levels and/or lower volatile organic compound levels for emulsion systems. Catalysts and activators well known in the prior art can be used in the redox polymerization step.

The addition of the seed polymers 1 and 2 into the polymerization medium in particular steps of the process enables the formation of particles having different particle sizes. Likewise, the flow of monomer emulsions with different compositions enables the particles to have different monomer compositions.

The water-based, polymodal polymer composition obtained by said process preferably comprises 40 to about 70 weight percent, more preferably higher than 55 weight percent of a solid phase. Particularly, the solid phase is 60 to 70 weight percent. The solid phase in total—without differentiating between the different sized particles and their different monomer compositions—is the reaction product of:

i) about 70 to about 98.5% by weight of monomers selected from the group consisting of acrylic acid ester monomers of C2 to C10 alcohols and mixtures thereof, preferably including n-butyl acrylate, isobutyl acrylate, n-pentyl acrylate, n-hexyl acrylate, 2-ethylhexyl acrylate, isononyl acrylate, decyl acrylate and mixtures thereof.

(ii) about 0 to about 20% by weight of monomers selected from the group consisting of vinyl esters, including vinyl acetate, vinyl propionate, vinyl butyrate, and the like, C1 to C4 esters of (meth)acrylic acid, including methyl methacrylate, methyl acrylate, ethyl acrylate, ethyl methacrylate, isobutyl methacrylate, styrene, and mixtures thereof;

(iii) about 1 to about 10% by weight of a polar monomer copolymerizable with said monomer(s) of element (i) and element (ii) selected from the group comprising acrylic acid, methacrylic acid, itaconic acid, and mixtures thereof;

(iv) about 0.01 to about 1% by weight of an initiator which may be used to start the free radical polymerization of the above monomers selected from the group comprising potassium persulfate, ammonium persulfate, sodium persulfate, and mixtures thereof;

(v) about 1 to about 10% by weight of emulsifiers which are suitable, such as anionic, cationic or nonionic surfactants selected from the group comprising alkyl sulfates, alkyl sulfosuccinates, alkyl aryl sulfonates, a-olefin sulphonates, quaternary ammonium salts, amine salts, fatty or resin acid salts, nonyl or octyl phenol reaction products of ethylene oxide;

(vi) about 0 to 1 percent by weight of a chain transfer agent; and (vii) about 0 to 5 percent by weight of a crosslinking agent;

wherein the weight percentages of (v), (vi), and (vii) are each based on the total weight of (i), (ii), (iii) and (iv) and wherein the weight percentages of (i), (ii), (iii) and (iv) are each based on the total weight of (i), (ii), (iii) and (iv).

According to a preferred embodiment of the present invention, the acrylate monomer A is n-butyl acrylate (BA), whereas the acrylate monomer B is preferably 2-ethylhexyl acrylate (2EHA).

As mentioned above, the polymodal polymer composition according to the present invention is composed of at least two different populations $P_1$ and $P_2$, wherein said two different populations jointly constitute at least 75% by weight of the total polymeric content within the polymer composition.

The sum of populations $P_1$ and $P_2$ preferably constitutes over 90% by weight, more preferably over 95% by weight, even more preferably 100% by weight, of the total polymeric content of the polymer.

Preferably, 75 to 95 percent by volume of the polymeric content of the polymodal polymer composition having heterogeneous particles produced by the above described process is occupied by the particles belonging to the population with the larger particles. More preferably 80-90% by volume of the polymeric content is occupied by the particles belonging to the population with the larger particles.

In a preferred embodiment of the present invention, the population with larger particles can constitute 85 weight percent of the solid phase having an average particle size of 250 to 750 nm wherein the remaining 15 weight percent of population of small particles are 50 to 200 nm.

The present invention will be further illustrated in the following reference examples and inventive examples without any limitation thereto.

EXAMPLES

The different exemplary embodiments are summarized and explained in detail below. Examples 5 is in accordance with the present invention.

Comparative Example 1

Seed addition (for bimodal particle size distribution) method has been used but the monomer composition only includes the below given Emulsion 5.1 structure.

Comparative Example 2

Seed addition method to obtain a bimodal particle size distribution has been used but only one monomer composition is prepared in a single emulsion vessel comprising all the monomers of Emulsion 5.1 and Emulsion 5.2 with the same amounts in total.

Comparative Example 3

Seed addition method has not been used, monomodal structure with same monomer composition as in Reference Example 2 (Emulsion 5.1+Emulsion 5.2).

Comparative Example 4

Seed addition (bimodal particle size distribution) method has been used but the monomer composition only includes the below given Emulsion 5.2 structure.

Example 5

Inventive embodiment for a bimodal polymer composition having heterogeneous particles.

Comparative Example 1

Preparation of Monomer Emulsions

For the preparation of Emulsion 1.1, 21.4 g of surfactant A* and 21.4 g of surfactant B** were dissolved in 154 g deionized water and added to an emulsion vessel equipped with a stirrer. 758 g butyl acrylate and 12.4 g of acrylic acid monomers were added into the same vessel, respectively.

*Surfactant A is fatty alcohol ether sulphate, sodium salt degree of ethoxylation about 30.

**Surfactant B is disodium ethoxylated alcohol (C10-12) half ester of sulfosuccinic acid.

The water-surfactant mixture was placed under high shear agitation at 200 rpm in the vessel. The monomers were slowly added into the water-surfactant mixture under sufficient stirring to make a monomer pre-emulsion. The required mixing time was 10 minutes for all the trials. The resulting monomer emulsions were homogenous, viscous and milky in appearance.

Preparation of Starting and Delayed Initiator

The starting initiator was prepared by adding 2.1 g of ammonium persulfate into 21 g of deionized water and stirred by using a magnetic bar. For the delayed initiator, 1.6 g of ammonium persulfate was dissolved in 64 g of deionized water and added into the reactor by 3 hours of feeding.

Polymerization Procedure

Delayed radical emulsion polymerizations and seeded polymerization were used for the initiation and the mere role of the surfactant in this system is simply to avoid coagulation by maintaining the stability of the polymer particles. All polymerizations were carried out using deionized water (DI). The seed had a particle size around 50 nm and has been used in the initiation step of the polymerization in order to control the particle size distribution. For the polymerization procedure 10.7 g of 50 nm seed dispersion with a 33% of solid (seed polymer) content, the starting initiator, and water were initially charged into the reactor. The monomer emulsion (Emulsion 1.1) and the delayed initiator were fed parallel in two streams both having the same feeding time of 3 hours, using a peristaltic pump via silicone tubing. The feed rate was monitored volumetrically. The reactions were performed in a 1 liter, round-bottomed reactor glass flask with a mechanical agitator and stirred at 180 rpm. The reactor flask was equipped with a reflux condenser, thermocouple and metallic stirrer. Polymerization temperature was maintained at 84-86° C., and agitation rate was increased when necessary. After 50% of the emulsion feeding, 23.4 g of 50 nm seed dispersion with a 33% of solid (seed polymer) content was added into the reactor for the formation of small particles. After the end of the feed, the monomer mix beaker was flushed with water and post-heated for 30 min. The reaction mixture was then cooled down to 55° C. and post redox reaction was done. A redox post polymerization process provides lower residual monomer levels and/or lower volatile organic compound levels for emulsion systems. As the redox couple t-butyl hydroperoxide and sodium salt of an organic sulfonic acid derivative were selected. In a neutralization step, ammonia solution (28%) was used to adjust the pH to approximately 7.0±0.5. Then, the polymer was filtered into a suitable container.

Comparative Example 2

Preparation of Monomer Emulsions

For the preparation of Emulsion 2.1, 21.4 g surfactant A* and 21.4 g surfactant B** were dissolved in 156.7 g deionized water and added to an emulsion vessel equipped with a stirrer. 376 g of butyl acrylate and 12.4 g of acrylic acid, 302.7 g of 2-ethylhexyl acrylate, 0.7 g of hydroxyl ethyl methacrylate, 30 g methyl methacrylate and 30 g ethyl acrylate were added into the same vessel, respectively.

The water-surfactant mixture was placed under high shear agitation at 200 rpm in the vessel. The monomers were slowly added into the water-surfactant mixture under sufficient stirring to make a monomer pre-emulsion. The required mixing time was 10 minutes for all the trials. The resulting monomer emulsions were homogenous, viscous and milky in appearance.

*Surfactant A is fatty alcohol ether sulphate, sodium salt degree of ethoxylation about 30.
**Surfactant B is disodium ethoxylated alcohol (C10-12) half ester of sulfosuccinic acid.

Preparation of Starting and Delayed Initiator

The initiator was prepared by adding 2.1 g of ammonium persulfate into 21 g of deionized water and stirred by using a magnetic bar. For the delayed initiator, 1.6 g of ammonium persulfate was dissolved in 64 g of deionized water and added into the reactor by 3 hours of feeding.

Polymerization Procedure

Delayed radical emulsion polymerizations and seeded polymerization were used for the initiation and the mere role of the surfactant in this system is simply to avoid coagulation by maintaining the stability of the polymer particles. All polymerizations were carried out using deionized water (DI). The seed polymer had particle size of around 50 nm and had been used in the initiation step of the polymerization in order to control the particle size distribution. For the polymerization procedure 10.7 g of 50 nm seed dispersion with a 33% of solid (seed polymer) content, the starting initiator and water were initially charged into the reactor. The monomer emulsion (Emulsion 2.1) and the delayed initiator were fed parallel in two streams both having the same feeding time of 3 hours, using a peristaltic pump via silicone tubing. The feed rate was monitored volumetrically. The reactions were performed in a 1 liter, glass made and round-bottomed reactor flask with a mechanical agitator and stirred at 180 rpm. The reactor flask was equipped with reflux condenser, thermocouple and metallic stirrer. Polymerization temperature was maintained at 84-86° C., and agitation rate was increased if necessary. After 50% of the emulsion feeding, 23.4 g of about 50 nm seed dispersion with a 33% of solid (seed polymer) content was added into the reactor for the formation of small particles. After the end of the feed, the monomer mix beaker was flushed with water and was post-heated for 30 min. The reaction mixture was then cooled down to 55° C. and post redox reaction was applied. A redox post polymerization process provides lower residual monomer levels and/or lower volatile organic compound levels for emulsion systems. As the redox couple t-butyl hydroperoxide/sodium salt of an organic sulfonic acid derivative were selected. In a neutralization step, ammonia solution (28%) was used to adjust the pH to approximately 7.0±0.5. Then, the polymer was filtered into a suitable container.

Comparative Example 3

Emulsion 3.1: 21.4 g surfactant A* and 21.4 g surfactant B** were dissolved in 156.7 g deionized water and placed in a vessel equipped with stirrer. 376 g butyl acrylate and 12.4 g of acrylic acid, 302.7 g 2-ethylhexyl acrylate, 6.2 g of acrylic acid, 10.7 g hydroxyl ethyl methacrylate, 30 g methyl methacrylate and 30 g ethyl acrylate were added, respectively. The only difference in this example was making the polymerization reaction without a seed polymer addition in the first or in any other stage of the polymerization process. The resulting polymer had a monomodal particle size distribution, although the same monomer composition as in Reference Example 2 had been used.

*Surfactant A is fatty alcohol ether sulphate, sodium salt degree of ethoxylation about 30.
**Surfactant B is disodium ethoxylated alcohol (C10-12) half ester of sulfosuccinic acid.

Comparative Example 4

Same as in Comparative Example 1 but the monomer composition of Emulsion 4.1 is different than Emulsion 1.1.

Emulsion 4.1: 21.4 g surfactant A* and 21.4 g surfactant B** were dissolved in 75.6 g deionized water and added in a vessel equipped with a stirrer. 602 g 2-ethylhexyl acrylate, 12.4 g of acrylic acid, 21.4 g hydroxyl ethyl methacrylate, 60 g methyl methacrylate and 60 g ethyl acrylate were added into the same vessel, respectively.

*Surfactant A is fatty alcohol ether sulphate, sodium salt degree of ethoxylation about 30.
**Surfactant B is disodium ethoxylated alcohol (C10-12) half ester of sulfosuccinic acid.

Example 5

Preparation of Monomer Emulsions

Emulsion 5.1: 10.7 g surfactant A* and 10.7 g surfactant B** were dissolved in 77.2 g deionized water and added in a vessel equipped with a stirrer. 379.3 g butyl acrylate and 6.2 g of acrylic acid were added into the same vessel, respectively.

Emulsion 5.2: 10.7 g surfactant A* and 10.7 g surfactant B** were dissolved in 75.6 g deionized water and added in a vessel equipped with a stirrer. 302.7 g 2-ethylhexyl acrylate, 6.2 g of acrylic acid, 10.7 g hydroxyl ethyl methacrylate, 30 g methyl methacrylate and 30 g ethyl acrylate were added into the same vessel, respectively.

The water-surfactant mixture was placed under high shear agitation at 200 rpm. The monomer mixtures were slowly added into the water/surfactant mixture under sufficient stirring to make a monomer pre-emulsion. The required mixing time was 10 minutes for all the trials. The resulting monomer emulsions were homogenous, viscous and milky in appearance.

*Surfactant A is fatty alcohol ether sulphate, sodium salt degree of ethoxylation about 30.

**Surfactant B is disodium ethoxylated alcohol (C10-12) half ester of sulfosuccinic acid.

Preparation of Starting and Delayed Initiator

The initial initiator was prepared by adding 2.1 g of ammonium persulfate into 21 g of deionized water and stirred by using a magnetic bar. For the delayed initiator, 1.6 g of ammonium persulfate was dissolved in 64 g of deionized water and added into the reactor by 3 hours of feeding.

Polymerization Procedure

Delayed radical emulsion polymerizations and seeded polymerization were used for the initiation and the mere role of the surfactant in this system is simply to avoid coagulation by maintaining the stability of the polymer particles. All polymerizations were carried out using deionized water (DI). The seed polymer had an average particle size of around 50 nm and had been used in the initiation step of the polymerization in order to control the particle size distribution. For the polymerization procedure, 10.7 g of 50 nm seed dispersion with a 33% of solid (seed polymer) content, starting initiator, and water were initially charged into the reactor. The monomer emulsion 5.1 (Emulsion 1) and half of the delayed initiator were fed parallel in two streams both having the same feeding time of 1.5 hours, using a peristaltic pump via silicone tubing. The feed rate was monitored volumetrically. The reactions were performed in a 1 liter, glass made and round-bottomed reactor flask with a mechanical agitator and stirred at 180 rpm. The reactor flask was equipped with reflux condenser, thermocouple and metallic stirrer. Polymerization temperature was maintained at 84-86° C., and agitation rate was increased if necessary. After the first feed, 23.4 g of about 50 nm seed dispersion with a 33% of solid (seed polymer) content was added into the reactor for the formation of small particles and the monomer emulsion 5.2 (Emulsion 2) and rest of the delayed initiator were fed for another 1.5 hour. After the whole feed, the monomer mix beaker was flushed with water, and was post-heated for 30 min. The reaction mixture was then cooled to 55° C. and post redox reaction was applied. A redox post polymerization process provides lower residual monomer levels and/or lower volatile organic compound levels for emulsion systems. As the redox couple t-butyl hydroperoxide/sodium salt of an organic sulfonic acid derivative were selected. In a neutralization step, ammonia solution (28%) was used to adjust the pH to approximately 7.0±0.5. Then, the polymer was filtered into a suitable container.

Film Preparation

A 50 μm film of the sample was applied on OPP "corona" treated >36 Din by automatic coater with the coating rate of 150 mm/min. The applied film was placed in an oven at 70° C. for 15 minutes.

Characterization, Analysis and Testing

The thermal properties of the polymers were measured by differential scanning calorimeters (Mettler Toledo, DSC 821e) in a flowing air atmosphere from −80° C. at a scanning rate of 10° C./min. Solid content was measured by drying the polymer films at 150° C. for 20 minutes after filtered from 60 micron filter. Weight of polymer (w1) and dried latex (w2) has been calculated by the following equation.

Solid %=$w2/w1 \times 100$

Coagulum content of polymer latex was measured after filterable solids of any runs were dried at room temperature for 24 hours. Then, coagulum content was measured by the weight of filterable solid in 1 liter of polymer dispersion. (ISO 4576) Free monomer measurements were performed by HS-GC (Perkin Elmer, HS 40 XL, Auto System XL) with FID detector and $N_2$ was used as carrier gas.

Viscosity was measured by Brookfield viscosimeter under room conditions by LVT 3/60 (ISO 3219).

pH of polymers was determined under room temperature according to ISO 976 by calibrated pH meter.

Surface tension of polymer dispersions has been measured by Du Nouy ring method according to ISO 1409.

The adhesive polymer was coated on BOPP film as 50 μm with applicator and was dried at 70° C. for 10 min. The adhesive-coated samples were left for 24 hours in a controlled environment (23±2° C., 50±5% relative humidity) chamber prior to testing the adhesive properties. A specimen of 25×400 mm was cut in the machine direction and laminated onto the clean stainless steel test plate using finger pressure. The average force to peel the specimen from test plate was recorded.

In FINAT technical handbook, peel adhesion is defined as force required removing pressure sensitive coated material, which has been applied to a standard test plate under specified conditions from the plate at a specified angle and speed. In this study, peel adhesions were tested according to FTM1 on stainless steel (SS), glass, aluminum (Al) and low density polyethylene (LDPE) as 180° at 300 mm/min by Adhesion Release Tester AR-1000. Test conditions were at 23±2° C., 50±5% relative humidity.

Shear strength is the internal cohesion and the resistance to shear from a standard surface and gives an indication of the mode of adhesive or cohesive failure. Static shear test was applied according to FTM 8 on stainless steel (SS), glass and low density polyethylene (LDPE), at 23° C. and the test equipment was 10 Bank Shear RT-10.

Loop tack value of PSAs is expressed as the force required separating, at a specified speed, a loop of material which has been brought into contact with a specified area of a standard surface (FTM 9). Loop Tack measured on stainless steel via Loop Tack Tester LT-1000.

The results are summarized in the following Table.

|  | Market Reference | COM. EX 1 | COM. EX 2 | COM. EX 3 | COM. EX 4 | EX. 5 |
| --- | --- | --- | --- | --- | --- | --- |
| Peel test, on Glass | 5.8 | 9.6 A.T. | 7 | 5.52 | 4.92 | 11.2 A.T. |
| Peel test, on HDPE, | 3.2 | 4.37 | 1.5 | 2.17 | 2.75 | 3.57 |
| Peel test, on LDPE | 1.6 | 2.92 | 1.25 | 1.37 | 2.55 | 2.71 |
| Peel test, on SS | 6.8 | 9.0 A.T | 6 | 7.55 | 5.02 | 11.3 A.T. |
| Peel test, BOPP, on painted Al | 2.1 | 2.8 | 2.68 | 2.84 | 1.8 | 9.2 A.T. |
| Peel test, BOPP, on PVC | 2 | 2.22 | 2.12 | 2 | 1.57 | 8.0 A.T. |
| Loop tack, on HDPE, N/25 mm | 4.5 | 4 | 2.8 | 4 | 2.4 | 4.0 |

-continued

|  | Market Reference | COM. EX 1 | COM. EX 2 | COM. EX 3 | COM. EX 4 | EX. 5 |
|---|---|---|---|---|---|---|
| Loop tack, on Glass, N/25 mm | 11.5 | 11.9 | 4.4 | 9.4 | 5.4 | 12.1 |
| Loop tack, on SS, N/25 mm | 8.6 | 7.3 | 5.2 | 8.7 | 6 | 10.6 |
| Loop tack, on LDPE, N/25 mm | 3.4 | 2.9 | 1.5 | 2.1 | 1.7 | 2.5 |
| Water Whitening Performance * | 5 | 2 | 3 | 3 | 1-2 | 1 |
| AGEING with 7 days at 60° C. | | | | | | |
| Peel test, on Glass | 2.24 | 5.8 | 6.5 | 6.8 | 4.5 | 6.4 |
| Peel test, on HDPE | 1 | 2.65 | 2.5 | 2.9 | 2.58 | 4.1 |
| Peel test, on LDPE | 0.8 | 1.46 | 1.63 | 1.7 | 1.78 | 2.3 |
| Peel test, on SS | 2.3 | 6.2 | 6.2 | 6.8 | 4.4 | 5.8 |
| Loop tack, BOPP, on HDPE | 3.5 | 3.41 | 1.71 | 3.7 | 2.02 | 3.19 |
| Loop tack, on Glass, | 13.4 | 11.99 | 11.57 | 9.43 | 7.92 | 14.3 |
| Loop tack, on SS, | 8.6 | 6.78 | 10.8 | 8.5 | 8.1 | 10.5 |
| Loop tack, on LDPE | 0.87 | 1.45 | 1.07 | 0.8 | 1.13 | 1.5 |

* 5 worst (white); 3 moderate (no whitening but blurish); 1 best (no whitening)

The invention claimed is:

1. A polymodal polymer composition formed by radical emulsion polymerization of primarily acrylic acid ester monomers of C2 to C10 alcohols which form homopolymers having glass transition temperatures (Tg's) below −15° C., characterized in that
the polymodal polymer composition is composed of at least two different populations of particles, said populations differing in mean particle size value by at least a factor of 2, wherein said two different populations jointly constitute at least 75% by weight of the total polymeric content within said composition and the Tg difference between the two populations being less than 20° C., wherein
(a) a population $P_2$ is constituted by at least 70% by weight of homogeneous particles containing polymer chains built of acrylate monomer B which forms homopolymers having a Tg below −15° C., wherein the content of said monomer B in these polymer chains is at least 70% by weight, and
(b) a population $P_1$, distinctive of $P_2$ by mean particle size value and monomer composition, of which the particles are constituted of polymer chains predominantly built of two acrylate monomers A and B, wherein monomer A also results in a homopolymer with Tg below −15° C., but where A and B differ from another by at least 2 C atoms in the alcohol side chain,
said population $P_1$ being constituted by at least 70% by weight of monomers A+B wherein A and B are not randomly co-polymerized, but in a sequential process whereby one monomer is polymerized after the other, inducing compositional heterogeneity in those polymeric chains constituting the particles of said population.

2. The polymodal polymer composition of claim 1, further comprising up to 20% of other monomers resulting in homopolymers with Tg's above −15° C., up to 5% of functional monomers containing carboxylic, sulfonic or phosphoric acid functionality, poly-unsaturated monomers, epoxy, hydroxy, amino, amido, di-carbonyl, and siloxane, and up to 5% of surface-active components including anionic and non-ionic surfactants, water-soluble colloids and polyelectrolytes capable of stabilizing polymer particles in the aqueous medium.

3. The polymer composition of claim 1, wherein the acrylate monomer A is n-butyl acrylate (BA).

4. The polymer composition of claim 1, wherein the acrylate monomer B is 2-ethylhexyl acrylate (2EHA) or octyl acrylate.

5. The polymer composition of claim 1, wherein the sum of populations $P_1$ and $P_2$ constitutes over 90% by weight of the polymer.

6. The polymer composition of claim 1, wherein the sum of populations $P_1$ and $P_2$ represents the entire population of particles present in the polymer composition.

7. The polymer composition of claim 1 for use as pressure sensitive adhesive, optionally for filmic materials, optionally for transparent and semi-transparent films that exhibit an excellent resistance to whitening when exposed to water.

8. A process for producing the polymer composition of claim 1, comprising the steps of:
separately providing a seed polymer having an average particle size of 10 nm to 100 nm, providing a first monomer emulsion comprising monomer A, and providing a second monomer emulsion comprising monomer B, respectively, polymerizing the first monomer emulsion by radical emulsion polymerization in an aqueous polymerization medium containing a first seed polymer; adding a second seed polymer and the second monomer emulsion to the polymerization medium; and polymerizing the second monomer emulsion, so as to produce particles of populations $P_1$ and $P_2$.

9. The process of claim 8, wherein monomer A is polymerized by at least 90% before monomer B is added to the polymerization medium for polymerizing the particles of population $P_1$.

10. The process of claim 8, wherein as monomer B is added and continues to grow the particles of population $P_1$, monomer B simultaneously produces the particles of population $P_2$ which results in a population $P_2$ of particles constituted by at least 70% by weight of monomer B.

11. The process of claim 8, further comprising a redox post polymerization treatment to reduce the level of residual monomer below 1%.

* * * * *